US012810612B2

(12) United States Patent
López Felip et al.

(10) Patent No.: US 12,810,612 B2
(45) Date of Patent: Nov. 24, 2026

(54) COMPUTING SYSTEM AND A COMPUTER-IMPLEMENTED METHOD FOR SENSING EVENTS FROM GEOSPATIAL DATA

(71) Applicant: OPTIMA SPORTS SYSTEMS S.L., Llinars del Valles (ES)

(72) Inventors: Maurici A. López Felip, Llinars del Valles (ES); Henry S. Harrison, Llinars del Valles (ES)

(73) Assignee: OPTIMA SPORTS SYSTEMS S.L., Llinars del Valles (ES)

(*) Notice: Subject to any disclaimer, the term of this patent is extended or adjusted under 35 U.S.C. 154(b) by 0 days.

(21) Appl. No.: 18/974,301

(22) Filed: Dec. 9, 2024

(65) Prior Publication Data

US 2025/0104424 A1 Mar. 27, 2025

Related U.S. Application Data

(63) Continuation of application No. 17/388,510, filed on Jul. 29, 2021, now Pat. No. 12,165,410.

(Continued)

(51) Int. Cl.

*G06V 40/20* (2022.01)
*G06F 18/22* (2023.01)

(Continued)

(52) U.S. Cl.

CPC .............. *G06V 20/41* (2022.01); *G06F 18/22* (2023.01); *G06T 7/20* (2013.01); *G06T 7/70* (2017.01);

(Continued)

(58) Field of Classification Search

None

See application file for complete search history.

(56) References Cited

U.S. PATENT DOCUMENTS 8,698,874 B2 4/2014 Watson et al.
2007/0061735 A1* 3/2007 Hoffberg .............. G06V 40/103 715/744

(Continued)

FOREIGN PATENT DOCUMENTS

EP 2396767 A2 12/2011
WO 2010091875 A2 8/2010

(Continued)

OTHER PUBLICATIONS

Article "Description and Discovery of Complex Events in Video Surveillance" authored by Ahmed Azough, Alexandre Delteil, Fabian De Marchi, and Mohand Said Hacid, published 2008 Thord International Workshop in Semantic Media Adaption and Personalization, pp. 27-32, copyright 2008, exact date unknown.

(Continued)

*Primary Examiner* — Eileen M Adams
(74) *Attorney, Agent, or Firm* — Hassan Abbas Shakir; Shakir Law PLLC

(57) ABSTRACT

A computer-implemented method including processing data describing a sporting event in order to: evaluate a collection of models, each receiving as input at least part of the processed data, or part of an output of other models, or a combination thereof; compare outputs of the models to at least one entry in an event library, each entry including data at least indicative of a type of gameplay event in terms of criteria defined over output values of at least part of the collection of models; and output an event record whenever the criteria of an entry in the event library are satisfied by the outputs of the models, the event record including data at least indicative of the type of gameplay event represented by the corresponding entry in the event library. Also, the method is part of a computing system and a non-transitory computer-readable medium.

13 Claims, 7 Drawing Sheets

Related U.S. Application Data

(60) Provisional application No. 63/058,035, filed on Jul. 29, 2020.

(51) Int. Cl.

| | |
|---|---|
| ***G06T 7/20*** | (2017.01) |
| ***G06T 7/70*** | (2017.01) |
| ***G06T 11/00*** | (2006.01) |
| ***G06V 20/40*** | (2022.01) |
| ***G06V 20/52*** | (2022.01) |
| ***G06V 40/10*** | (2022.01) |
| ***H04N 5/272*** | (2006.01) |
| *G06Q 10/0639* | (2023.01) |
| *G06Q 10/10* | (2023.01) |

(52) U.S. Cl.

CPC .............. *G06T 11/00* (2013.01); *G06V 20/42* (2022.01); *G06V 20/53* (2022.01); *G06V 40/10* (2022.01); *G06V 40/20* (2022.01); *H04N 5/272* (2013.01); *G06Q 10/0639* (2013.01); *G06Q 10/10* (2013.01); *G06T 2207/10016* (2013.01); *G06T 2207/20072* (2013.01); *G06T 2207/30196* (2013.01); *G06T 2207/30221* (2013.01); *G06T 2207/30241* (2013.01); *G06T 2210/62* (2013.01); *G06V 20/44* (2022.01)

(56) References Cited

U.S. PATENT DOCUMENTS

| | | | | |
|---|---|---|---|---|
| 2008/0192116 | A1 | 8/2008 | Tamir et al. | |
| 2009/0153661 | A1 | 6/2009 | Cheng | |
| 2011/0302003 | A1 | 12/2011 | Shirish et al. | |
| 2012/0078503 | A1 | 3/2012 | Dzubay | |
| 2012/0203673 | A1 | 8/2012 | Morgan et al. | |
| 2016/0111086 | A1 | 4/2016 | Ziolko | |
| 2018/0157769 | A1 | 6/2018 | Staves | |
| 2019/0022487 | A1 * | 1/2019 | Joo | A63B 60/46 |
| 2019/0205652 | A1 | 7/2019 | Ray et al. | |
| 2019/0318651 | A1 | 10/2019 | Fenyvesi et al. | |
| 2021/0125365 | A1 | 4/2021 | Mirza | |
| 2021/0279475 | A1 | 9/2021 | Tusch | |
| 2022/0375362 | A1 | 11/2022 | Canberk | |

FOREIGN PATENT DOCUMENTS

| | | | |
|---|---|---|---|
| WO | 2015151095 | A1 | 10/2015 |
| WO | 2019141813 | A1 | 7/2019 |

OTHER PUBLICATIONS

Article "Bring it to the Pitch: Combining Video and Movement Data to Enhance Team Sport Analysis" authored by Manuel Stein et al., published in IEEE Transactions on Visualization and Computer Graphics, vol. 24, No. 1 Jan. 2018 on pp. 13-22.

Article "Scene-based event detection for baseball videos" authored by Cheng-Chang Lien et al., published J. Vis. Commun. Image R. 18 (2007) at pp. 1-14, made available online at Nov. 14, 2006 via www,sciencedirect.com.

* cited by examiner

COMPUTING SYSTEM AND A COMPUTER-IMPLEMENTED METHOD FOR SENSING EVENTS FROM GEOSPATIAL DATA

CROSS-REFERENCE TO RELATED APPLICATIONS

This application claims priority U.S. Ser. No. 17/388,510, which was filed Jul. 29, 2021 and is pending, and which is hereby incorporated by reference in its entirety for all purposes. U.S. Ser. No. 17/388,510 claims priority from a U.S. Ser. No. 63/058,035, which was filed Jul. 29, 2020 and which is hereby incorporated by reference in its entirety for all purposes.

TECHNICAL FIELD

The present disclosure relates to the field of computing devices and systems. More specifically, it relates to devices, systems and methods that enable at least one of identification, communication, instruction, and demonstration of patterns occurring among moving individuals via automatic detection and display.

BACKGROUND OF THE DISCLOSURE

In many domains, rich data is generated consisting of trajectories of individuals. This is the case in domains such as transportation, architecture, event planning, public health, sports, ecology, and armed conflict, among others. In all these domains, a typical problem is the identification of patterns based on the trajectories that represent events. Various types of events are useful to detect in different domains, including transportation bottlenecks, illegal activity, dangerous public health situations, and sports tactics, among others.

Typical methods of analyzing trajectory data have one or more limitations. Many methods focus on classifying individual trajectories and therefore are not capable of detecting patterns that involve the interaction between individuals. This limitation applies to unsupervised or sem-supervised methods such as clustering (see Wilson, Rintoul, and Valicka, 2016, "Exploratory Trajectory Clustering with Distance Geometry", DOI:10.1007/978-3-319-39952-2_26), Markov chains (see Nascimento, Figueiredo, and Marques, 2009, "Trajectory Classification Using Switched Dynamical Hidden Markov Models", DOI:10.1109/TIP.2009.2039664), and other approaches such as the combination of Markov models and dynamical systems (see Kooij, Englebienne, and Gavrila, 2012, "A Non-parametric Hierarchical Model to Discover Behavior Dynamics from Tracks", DOI:10.1007/978-3-642-33783-3_20).

Another limitation of the aforementioned methods as well as others is that they are black boxes; that is, it is impossible or difficult for users of the models to understand or modify their inner workings according to their domain knowledge. In other words, they lack interpretability, a well-known limitation of common machine learning techniques. For example, this applies to the method of Owoh, Singh, and Zaaba (2018, "Automatic Annotation of Unlabeled Data from Smartphone-Based Motion and Location Sensors", DOIi: 10.3390/s18072134). In these cases, users of the method are not able to apply specific domain knowledge to the problem or fine-tune the method based on the particular use case in question.

Finally, existing methods tend to focus on an individual aspect of the trajectories, such as intersections, (e.g., Wang, Wang, Song, and Raghavan, 2017, "Automatic intersection and traffic rule detection by mining motor-vehicle GPS trajectories", DOI:10.1016/j.compenvurbsys.2016.12.006), mobility mode (Chen, Chen, Li, Wang, and Yao, 2019, "Mobility modes awareness from trajectories based on clustering and a convolutional neural network", DOI:10.3390/ijgi8050208), or individual preferences (e.g. Barth, Jepsen, Funke, Proissl, 2020, "Scalable unsupervised multi-criteria trajectory segmentation and driver preference mining", DOI:10.1145/3423336.3429348). Thus, these methods do not satisfy the needs of domain practitioners who must identify events whose defining characteristics encompass multiple such aspects.

In summary, a gap exists between state-of-the-art trajectory analysis techniques and the needs of practitioners within the various domains for which trajectory data is relevant. Therefore, as previously mentioned, manual annotation of events remains prevalent. It would therefore be advantageous to provide a solution that would overcome these limitations.

SUMMARY

Computing systems and computer-implemented methods as described in the present disclosure are intended for sensing events and, optionally and preferably, augmentation of video feed with overlay.

A first aspect of the disclosure relates to a computer-implemented method that comprises: a data acquisition step, and an event sensing step.

The data acquisition step comprises the acquiring of geospatial data representing a dynamic activity where a dynamic activity is a situation bounded in space within which one or more individuals participate and whose participation involves movement within the space. Individuals can include humans, animals, machines, or any entity capable of movement. Dynamic activities include but are not necessarily limited to entertainment events such as concerts, parties, and sporting events; industrial activities such as factories, farms, and construction sites; and other domains such as transportation, retailing, and shipping. Subsequently, the unqualified term "activity" should be understood as implying "dynamic activity".

Geospatial data includes but is not necessarily limited to positional data by collection, generation, transfer, or other means. In some embodiments, the data acquisition step further comprises the acquisition of video of the dynamic activity during a period of time that overlaps with positional data timesteps. In some embodiments, the data acquisition step further comprises the acquisition of one or more homographies. A homography is a mapping between two coordinate systems; in the context of this disclosure, it maps between the coordinate system of the real world in physical units such as meters, and the coordinate system of video acquired during the data acquisition step. In some embodiments, the data acquisition step further comprises the acquisition of metadata. Metadata describes any characteristic of the dynamic activity or its participants that may be known by any means prior to observation of the dynamic activity (e.g., characteristics of the participants during previous activities).

When describing subsequent steps, "geospatial data" or the unqualified term "data" may refer to any part or the entirety of the data acquired during the data acquisition step.

In some embodiments, the data acquisition step includes a video capture step during which video is collected to use as input for computer vision tracking steps. Alternatively, or additionally, in some embodiments, the data acquisition step comprises the collection of data from one or more third-party data providers, that is to say, the data acquisition step includes the reception of data by means of wired or wireless communications, including by means of a data connection on the Internet. In some embodiments of the disclosure, the data acquisition step includes a series of computer vision steps.

The event sensing step comprises the processing of data for the purposes of detecting the occurrence of events during the dynamic activity. Events are observable actions during a dynamic activity at any level of analysis. The type of event that is of interest to detect depends on the domain of the activity but in all cases events are patterns among two or more individuals that are relevant to the activity. In some domains, some events may have other common referents such as "incidents" in some industrial contexts or "tactics" in sports contexts, for example. In this disclosure, the unqualified term "event" refers to these events of interest to detect rather than a dynamic activity as a whole.

In some embodiments of the disclosure, the event sensing step comprises: a description step and an event detection step.

In some embodiments of the disclosure, the description step comprises the execution of a model graph, where a model graph is a set of mathematical models or algorithms of any variety, possibly a heterogeneity of types of models, connected to each other by their dependency relations. That is, if the output of a model is required as an input to another, these models are connected in the graph. The models and their dependency relations form a directed graph. One or more models use as input the data acquired during the data acquisition step, and therefore form a start of the graph. During the description step, the models in the model graph are evaluated respecting the dependencies of each model, such that no model is evaluated until all its dependencies, or required inputs, are available. In some embodiments, the model outputs correspond to descriptions of the dynamic activity in conceptual terms understood by subject-matter experts.

In some embodiments of the disclosure, the event detection step comprises the detection of events by comparison of outputs of the model graph with criteria in a pattern library. Every entry in the pattern library describes the pattern corresponding to a type of event in terms of criteria defined over output values of a subset of models in the model graph. The pattern library comprises a plurality of patterns; in this sense, in some embodiments, the method comprises populating the pattern library with a plurality of patterns, either prior to or during the event detection step. The population of the pattern library can be by introducing the patterns with user input means, in which case the user (for example but without limitation, a subject-matter expert) introduces the patterns in the library, or by downloading the patterns to the pattern library from a remote server or database via a wired or wireless connection. In some embodiments, entries in the pattern library also contain criteria for assigning roles to individuals involved in the event. In some embodiments, these entries may include specific steps for determining spatial information such as relevant locations as a function of the data corresponding to the time of the event.

In some embodiments of the disclosure, the outputs of the event detection step are event records. In some embodiments, each event record includes one, some or all of an event identifier, start and end times, a set of individuals optionally identified by roles, and relevant spatial information.

In some embodiments, the method further comprises a virtual camera creation step, which uses positional data to create a virtual moving camera that follows the action of the activity, zooming in to the extent possible while leaving all or most of the participants visible. The resulting video may be referred to as a virtual camera video, tactical camera video, or action camera video. The virtual camera creation step also modifies the homographies such that the mapping of each video frame is correct given the new camera view.

In some embodiments, the method further comprises an overlay generation step after the event sensing step. In the overlay generation step, the homographies and event records are used to draw graphical overlays on the video by means of mapping tracking data (of individuals identified by role in the event record) and spatial information contained in the event record to video coordinates by the homographies. Graphical overlays comprise graphical elements superimposed on the original video feed that illustrate, highlight, or emphasize some aspect of the activity and are also referred to as telestrations (in the case of these embodiments of the disclosure, automatic telestration). In embodiments that include a virtual camera creation step, the input video may be the virtual camera video; otherwise, it may be the video output by the data acquisition step. The result of the overlay generation step is one or more augmented videos.

Aspects and embodiments of the present disclosure here allow, based on the heterogeneous algorithms set of the model graph, one or more of the following, for a series of advantageous functionalities in respect to the prior-art. First, automatic detection of patterns in the dynamic activity; that are of direct interest for observers of the activity—in lieu of traditional statistical trends or numeric values that require interpretation. Second, it allows for automatic classification of the patterns based on data revealed in the process of the detection (e.g., the individuals involved, location, duration) and/or attributes of the type of event. And thirdly, it allows for automatic graphic representation for each pattern detected and generated in an augmented video which communicates the nature of the pattern. Such video has value for purposes such as review and improvement of procedures; prediction and avoidance of adverse events; education and training; and content generation. Further, it may do so in a way constrained by computational processing capacity rather than human attentional capacity, and with objective analysis. These innovations allow for dynamic activities to be analyzed more quickly, in greater width and depth, with greater interpretability, based on a variety of attributes of the activity, and in parallel, compared to previous methods, saving time and resources of stakeholders while increasing the level of engagement with the content. Therefore, the present aspects and embodiments improve the efficiency, efficacy, and cost-effectiveness of incident identification, communication of event characteristics, monitoring of activities, design of spaces, and other use cases concerned with events occurring during dynamic activities.

A second aspect of the disclosure relates to a computing system for sensing events and augmentation of video feed with overlay that comprises a data acquisition module and a sensor module. The computing system has at least one processor and at least one memory for implementation of modules comprised in the system. The data acquisition module is a device or component configured to carry out the data acquisition step as previously described. Similarly, the sensor module is a device or component configured to carry out the event sensing step previously described. In some embodiments, a virtual camera module is a device or component configured to carry out the virtual camera creation step. Some embodiments further comprise an overlay module configured to perform the overlay generation step.

In some embodiments, the data acquisition module includes a video capture module configured to execute the video capture step, and a computer vision tracking system configured to execute computer vision tracking steps.

In some embodiments, the sensor module contains a description module and an event detector module.

In some embodiments, the description module comprises a representation of one or more model graphs and a model graph execution module configured to evaluate the model graphs as previously described.

In some embodiments, the event detection module comprises a pattern library and a pattern matcher module configured to evaluate the criteria defined in the pattern library as previously described.

A third aspect of the disclosure relates to a computer-implemented method comprising:

- digitally processing video footage of a dynamic activity in order to:
  - register coordinates of the video footage and estimate coordinates of a real-world space where the activity takes place as appearing in the video footage, and thereby provide a homography mapping between both coordinates; and
  - detect individuals in each frame of the video footage, associates the detected individuals between adjacent frames, and use both the associated detection of the individuals and the homography mapping to output a dataset with positional data of the individuals and/or trajectories of the individuals;
- digitally processing a collection of models associated with the dynamic activity in order to:
  - construct a vector model graph with the models in the collection;
  - input at least part of the dataset into the vector model graph for evaluation thereof;
  - construct, based on the evaluated vector model graph, a subset of spatial models into a graph for each group of N frames of the video footage, with the video footage at least comprising N frames; and
  - input at least part of the dataset into the graph of the subset of spatial models for evaluation thereof, thereby providing spatial model evaluation outputs;
- digitally processing pattern definitions in a pattern library associated with the dynamic activity in order to:
  - compare each pattern definition with each spatial model evaluation output; and
  - output an event record for each spatial model evaluation output that fulfills the pattern definition, the event record including data at least indicative of an event of the pattern definition, and start and end times that the pattern definition is fulfilled according to respective start and end frames of the video footage.

In some embodiments, each model in the collection is configured to take as input at least one of: positional data of the individuals of the dynamic activity, and an output of one or more other models in the collection; wherein each pattern definition includes data at least indicative of a rule defining conditions in terms of inequality relationships defined over outputs from a model graph; wherein at least one model in the collection is configured to take the positional data as input.

In some embodiments, the data of each pattern definition is at least further indicative of:

- one or more rules for assigning a role to individuals during the event or activity, each rule defining at least one condition in terms of outputs from the model graph for determining fulfillment of the rule by the individual; and
- a mapping of roles to glyph specifications, where glyphs are visual elements in the video footage; and
- the data of the event record is at least further indicative of one or more individual role assignments according to the fulfillment of the one or more rules of the pattern definition.

In some embodiments, the video footage is a first video footage, and the method further comprises:

- digitally processing the first video footage in order to output second video footage comprising the first video footage with glyphs digitally added thereto, wherein the glyphs are at least added in the video footage according to one or more pattern definitions that are fulfilled, the glyphs being added between respective start and end frames of each pattern definition that is fulfilled and on the individual or individual in the individual role assignment or assignments indicated on the event record, wherein the glyphs are determined by the mapping of individual roles to glyph specifications, and wherein the digital processing adds the glyphs in the video footage by applying a reverse of the homography mapping.

In some embodiments, the method further comprises: capturing the video footage with a camera in the real-world space of the dynamic activity; or receiving the video footage from a computing device or a video camera as a data transmission.

In some embodiments, the step of digitally processing the video footage from the dynamic activity to provide the homography mapping and the dataset comprises at least one of:

- digitally processing two or more video footages of the same dynamic activity captured with different perspectives, the two or more video footages comprising the video footage; and
- digitally processing the video footage and measurements of one or more position measuring sensors arranged on at least some individuals of the dynamic activity; and
- the two or more video footages and/or the measurements are digitally processed to provide the homography mapping and the dataset.

In some embodiments, the collection of models is represented as a directed acyclic graph, with both each model being a node in the graph and each edge in the graph representing a dependency relationship pointing from one model to another model whose output is required as an input to the first model.

In some embodiments, the digital processing of the collection of models is such that the digital processing evaluates the collection of models by:

- traversing the directed acyclic graph of models in depth-first order, and
- reversing the resulting order such that the model traversed last is evaluated first, the model traversed first is evaluated last, and so on.

In some embodiments, the models are classified in two categories: vector models configured to evaluate all timesteps of a sample of the sporting event simultaneously, and spatial models that are executed timestep-by-timestep;

wherein the digital processing of the collection of models is such that the digital processing further:

evaluates the directed acyclic graph of the subset of the models that are vector models;

evaluates, at each timestep during the timestep-by-timestep evaluation of pattern definitions of the pattern library, whether the event (of a potential event record) is potentially active or not during the timestep according to a comparison parameter included in a respective pattern definition;

adds, in case the evaluation indicates that the event is potentially active, one or more spatial models defined in a respective pattern definition to a collection of spatial models for the respective timestep;

constructs a directed acyclic graph of models based on both all the spatial models and dependencies thereof, evaluates the spatial models in the directed acyclic graph of models respecting the dependencies thereof, thereby providing the spatial model evaluation outputs.

In some embodiments, the method further comprises additional steps as described with reference to the first aspect of the disclosure.

A fourth aspect of the disclosure relates to a computing system comprising: at least one processor, and at least one memory; the at least one memory comprising instructions which, when executed by the at least one processor, cause the computing system to at least perform the method according to the first or third aspect of the present disclosure.

In some embodiments, the at least one memory further comprises a collection of models associated with a dynamic activity, and a pattern library with pattern definitions associated with the dynamic activity.

In some embodiments, the computing system further comprises at least one of: a video camera configured to capture the video footage, and a wired or wireless communications module configured to receive the video footage from a computing device or a video camera.

In some embodiments, the computing system comprises a plurality of video cameras adapted to capture the two or more video footages, and/or the one or more positions measuring sensors.

A fifth aspect of the disclosure relates to a data processing apparatus comprising at least one processor adapted to perform a method according to the first or third aspect of the disclosure.

A sixth aspect of the disclosure relates to a computer program product that has instructions which, when executed by a computing device or system, cause the computing device or system to perform a method according to the first or third aspect of the disclosure.

Upon running the computer program product on one or more processors of the computing device or system, the computing device or system senses events and, optionally and preferably, augments video feed with overlay.

In some embodiments, the computer program product is embodied on a non-transitory computer-readable medium or a computer-readable data carrier has the computer program product stored thereon.

A seventh aspect of the disclosure relates to a data carrier signal carrying a computer program product according to the sixth aspect of the disclosure.

The advantages of the first and second aspects of the disclosure may likewise apply to the third, fourth, fifth, sixth and seventh aspects of the disclosure.

DETAILED DESCRIPTION

Figure 1:
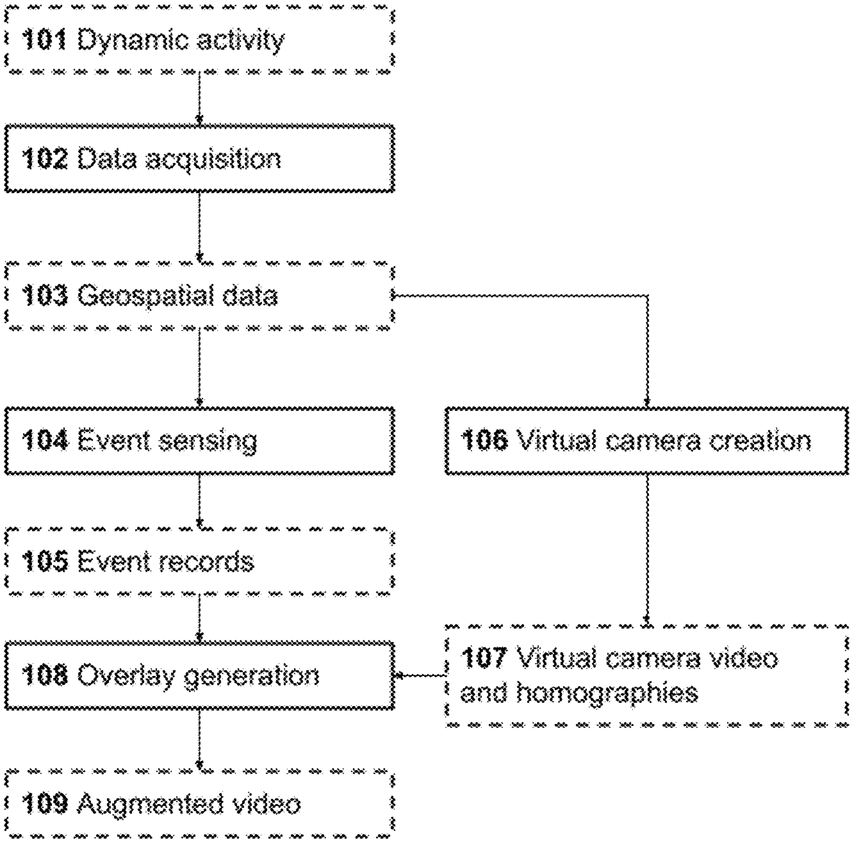
FIG. 1. A flowchart illustrating the steps (solid outlines) and input/outputs (dashed outlines) in embodiments of the disclosure.
Figure 2:
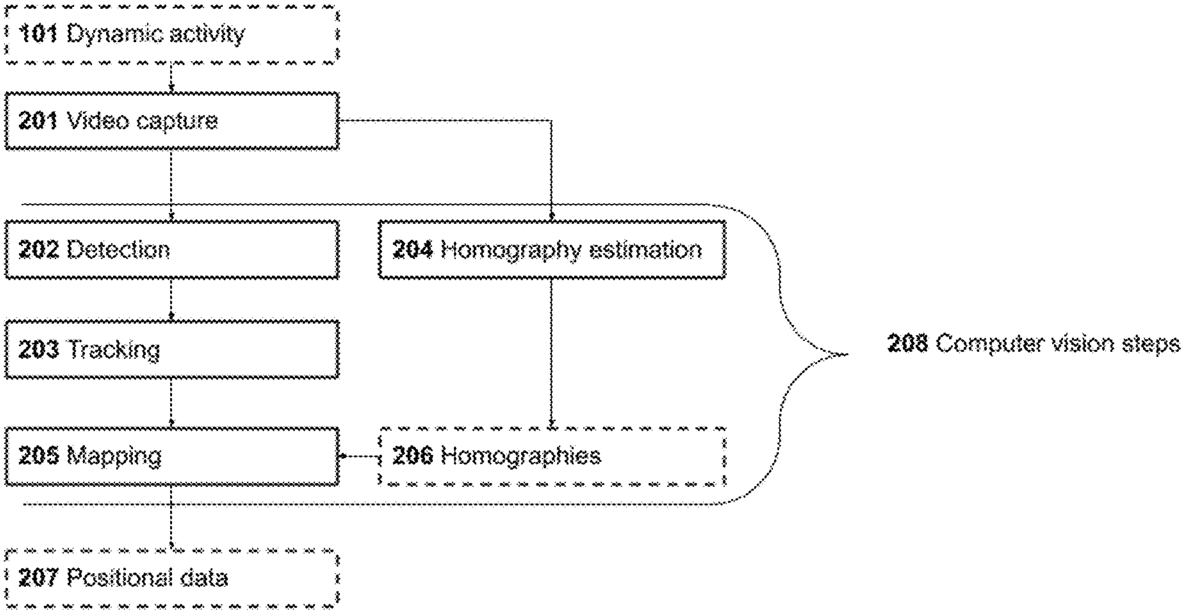
FIG. 2. A flowchart illustrating the substeps of the data acquisition step in embodiments of the disclosure.
Figure 3:
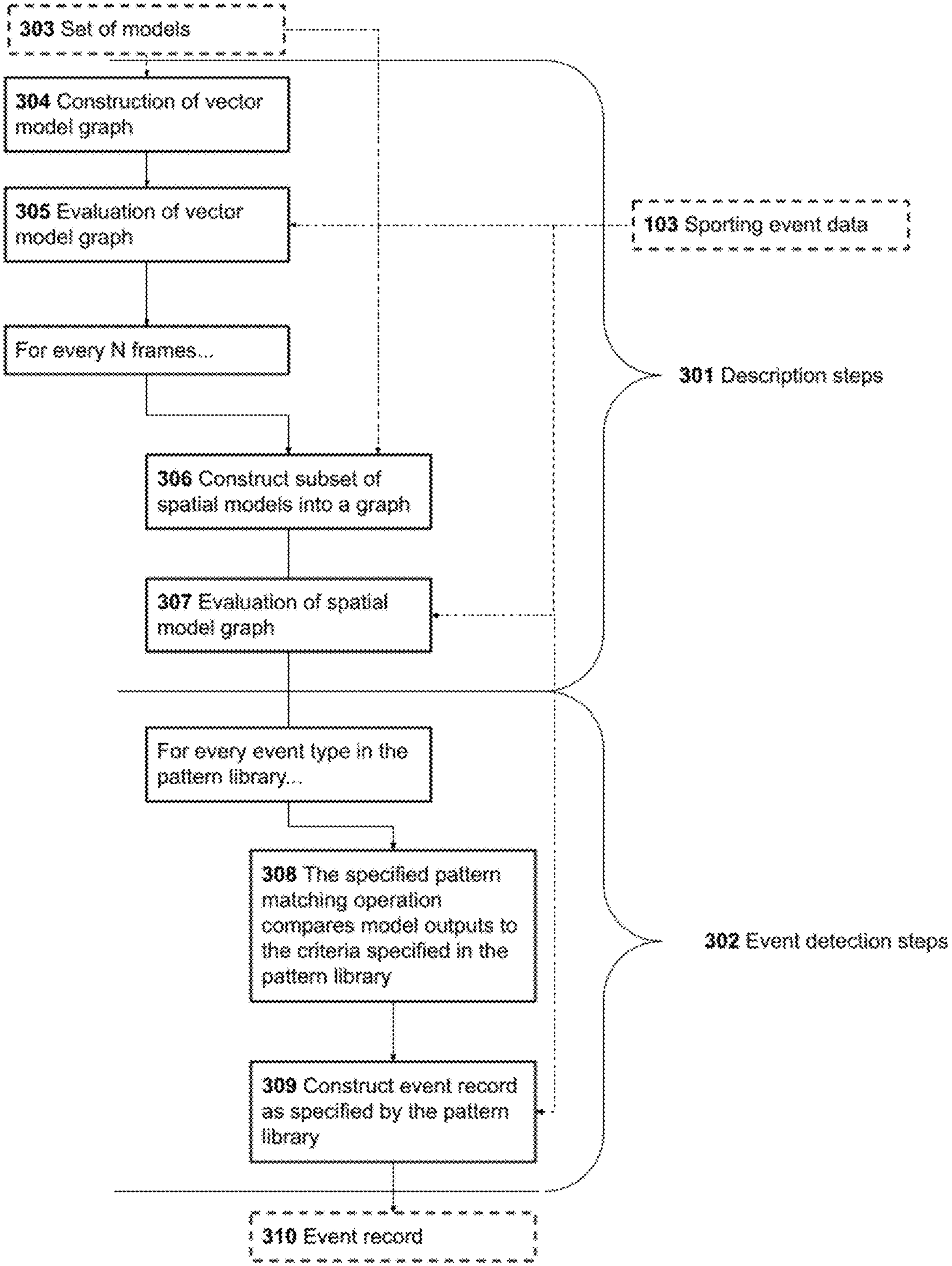
FIG. 3. A flowchart illustrating the substeps of the event sensing step in embodiments of the disclosure.

With reference to the drawings, particularly FIGS. 1-3, a computing system and computer-implemented method for sensing events from geospatial data, and optionally augmentation of video feed with overlay will now be described.

FIG. 1 illustrates the steps of some embodiments of a method for sensing events and augmentation of video feed with overlay. Steps are shown with solid outlines and intermediate products of the steps are shown with dashed outlines, as with FIG. 2 as well. Minimally, the method comprises a data acquisition step 102, comprising the acquisition of data from a dynamic activity 101 and an event sensing step 104, comprising the detection of event records 105. This minimal embodiment detects events but without additional steps, does not augment video feed with overlay.

The data acquisition step 102 minimally comprises the acquisition of geospatial data 103, which itself comprises positional data, by collection, generation, transfer, or other means. Positional data, also referred to as tracking data or trajectory data, represents the location of a set of individuals, individuals participating in a dynamic activity, at a set of moments during the dynamic activity. The dynamic activity 101 is a situation bounded in space within which one or more individuals participate and whose participation involves movement within the space. Individuals can include humans, animals, machines, or any entity capable of movement. Dynamic activities include but are not necessarily limited to entertainment events such as concerts, parties, and sporting events; industrial activities such as factories, farms, and construction sites; and other domains such as transportation, retailing, and shipping.

The particular moments during which positional data is acquired are referred to as timesteps or frames. In some embodiments, geospatial data 103 further comprises additional types of data, which can include video and/or metadata, to be described later. When describing subsequent steps, "geospatial data" 103 or the unqualified term "data" may refer to any part or the entirety of the data acquired during the data acquisition step 102.

The event sensing step 104 comprises the processing of geospatial data 103 for the purposes of detecting the occurrence of events. Events are observable actions during a dynamic activity at any level of analysis. The type of event that is of interest to detect depends on the domain of the activity but in all cases events are patterns among two or more individuals that are relevant to the activity. In some domains, some events may have other common referents such as "incidents" in some industrial contexts or "tactics" in sports contexts, for example. In this disclosure, the unqualified term "event" refers to these events of interest to detect. The event sensing step outputs event records 105, each describing the occurrence of one event and minimally comprising the type of event and the time of occurrence, which may be a single timestep or a duration between starting and ending timesteps. Event records may also be referred to as pattern records.

In some embodiments, the event sensing step 104 is followed by an overlay generation step 108, during which the homographies and event records 105 are used to draw graphical overlays on the video by means of mapping tracking data (of individuals identified by role in the event record) and spatial information contained in the event record to video coordinates by the homographies. Graphical overlays comprise graphical elements superimposed on the original video feed that illustrate, highlight, or emphasize some aspect of the activity and are also referred to as telestrations (in the case of these embodiments, automatic telestration). In embodiments in which the method includes a virtual camera creation step 106, the input video may be the virtual camera video 107 and the applied homographies are those referring to the virtual camera video; otherwise, it may be the video output by the data acquisition step 102 and the applied homographies are those referring to the video. The result of the overlay generation step is one or more augmented videos 109. An augmented video comprises a video of some subset of the dynamic activity during which one or more event occurs, with these events illustrated by means of overlay elements which may include circles, lines, arrows, text, or other visual elements automatically drawn on the video, and whose properties including location in the video are determined by the characteristics of the event, the positions of the individuals, and the homographies. In some embodiments, graphical overlays not only demonstrate actually occurring events but also show potential or hypothetical events such as dangerous incidents that could occur.

FIG. 2. illustrates the substeps of the data acquisition step 102, which in some embodiments further comprises a video capture step 201 which comprises the acquisition of video of the dynamic activity 101 during a period of time that overlaps with positional data timesteps. In some embodiments, video capture is accomplished by means of recording or transmission from one or more cameras. In some embodiments, video capture is accomplished by means of transfer of video from other sources by wired or wireless means. A more accurate sensing of the sport events can be provided with videos having higher resolutions, for example 720p or higher resolution videos (preferably 1080p or greater) are preferred.

In some embodiments, the data acquisition step 102 further comprises a homography estimation step 204 comprising the acquisition of one or more homographies 206. The homography estimation step may also be referred to as camera pose estimation. A homography is a mapping between two coordinate systems; in the context of this disclosure, it maps between the coordinate system of the real world in physical units such as meters, and the coordinate system of video acquired during the data acquisition step 102, in units of pixels. The space of the event represented by real-world coordinates has different referents in different contexts, for example grounds, arena, campus, playing surface, or field of play. In this disclosure, the term "activity area" denotes the bounded extent within which the activity takes place. In cases where the video is from a static perspective, only one homography is needed. In cases where the video is from a moving perspective, a homography is estimated for some subset of the frames of the video. In preferred embodiments, a homography is estimated for every frame.

In some embodiments, the data acquisition step comprises a series of computer vision steps 208. In some embodiments, the data acquisition step 102 further comprises a video capture step 201 during which video is collected to use as input for the computer vision tracking steps 208. Alternatively, or additionally, in some embodiments, the data acquisition step 102 comprises the collection of data from one or more third-party data providers, that is to say, the data acquisition step 102 may include the reception of data by means of wired or wireless communications, including by means of a data connection on the Internet.

In some embodiments, the computer vision steps 208 include several processing steps with the overall purpose of acquiring data from a dynamic activity. In a detection step 202, individuals are detected in video frames. This can be done with state-of-the-art people detection neural networks such as Faster R-CNN as known in the art, for example as described in Ren, He, Girshick, and Sun (2015; "Faster R-CNN: Towards Real-Time Object Detection with Region Proposal Networks"; arXiv:1506.01497). In a tracking step 203 the system associates individuals detected in one frame with individuals detected in subsequent frames. This can be done in several ways, in some embodiments using information on visual similarity and positional similarity, as known in the art, for example as described in Bergmann, Meinhardt, and Leal-Taixe (2019; "Tracking without bells and whistles"; arXiv:1903.05625). In a homography estimation step 204, the system estimates the camera pose, that is, the relationship or homography between the video coordinate system and the real-world coordinate system and uses this homography 206 to project locations in video coordinates onto real-world area coordinates. As previously mentioned, one or multiple homographies may be estimated depending on the embodiment. Homography estimation can be accomplished by methods known in the art including the one described in patent document EP2396767A2. Each homography 206 is represented as a matrix which when multiplied by a video coordinate location, returns a real-world coordinate location. Finally, a mapping step 205 applies the transformation represented by the homographies by matrix multiplication to the tracked detections in order to map them from video coordinates to real-world coordinates and thereby generate positional data 207.

The event sensing step 104 is accomplished with a series of description steps 301 and a series of event detection steps 302, as illustrated in FIG. 3. The description steps 301 develop a high-level description of of the dynamic activity, describing aspects not included in the output of the data acquisition step 102, such as characteristics of individuals or groups of individuals. The event detection steps 302 determine, based on this description, the event or events that are occurring in any timestep.

In some embodiments, the primary unit of analysis within the description steps 301 is a model. Models are algorithms that can provide one or more values describing the activity. Conceptually, the models create progressively richer and more semantic representations of the state of the activity. The set of models may include heuristics or straightforward arithmetical computations, physics-based models, neural networks, or any other computational method or routine; that is to say, the set of models is heterogenous. They can take as input any combination of geospatial data 103, and the outputs of other models. The output of a model can be a scalar, or a higher-dimensional array indexed by time, individuals, space, or other indexing strategies. For example, in an embodiment concerning association football a complex model requiring tracking data calculates the pass availability of each individual on offense without the ball, as known in the art, for example as described in Spearman, Basye, and Hotovy (2017; "Physics-Based Modeling of Pass Probabilities in Soccer"; MIT Sloan Sports Analytics Conference). The output of this model is indexed by individual and timestep. In addition to the computational process, each model defines its inputs and any parameters that modulate its results. These parameters can then be adjusted to improve the performance of the disclosure or customize its output.

In some contexts, the term "variable" is used to refer to models. Because the typical meaning of "variable" implies the output of a model rather than the model, we prefer to use the term "model" in order to distinguish the algorithm or model from its output.

In some embodiments, the event detection steps 302 comprise the detection of events by comparison of outputs of one or more model graphs, with criteria in a pattern library. A pattern library, also called an event library or event type library, is a collection of entries referring to a specific type of pattern or event. Every entry, or pattern, in the pattern library describes the pattern corresponding to a type of event in terms of criteria defined over output values of a subset of models in the model graph. These entries can also be referred to as pattern definitions, event definitions, or event type definitions. The pattern library is populated as part of a method according to the present disclosure and/or prior to or during operation of a system according to the present disclosure, for example retrievable from a remote server and/or manually introducible by users like subject-matter experts. In some embodiments, entries in the pattern library also contain criteria for assigning roles to individuals involved in the event and a set of instructions for evaluating the criteria, referred to as a pattern matching operation. In some embodiments, these entries may include specific steps for determining spatial information such as relevant locations as a function of the data corresponding to the time of the event. In some embodiments, every entry in the pattern library further includes a set of models whose output is required for the pattern to be evaluated. In some embodiments, each entry also includes spatial models whose output is used, optionally with rules that determine on any given timestep whether the model is needed. For example, an entry may require in order to evaluate its criteria a model that outputs an estimated future trajectory of individuals in the dynamic activity, but this model output is only relevant during some conditions as determined by aforementioned rules.

In some embodiments, the description steps 301 include the construction of graphs of models 304, 306. Model graphs are sometimes referred to as variable graphs. A model graph is a set of mathematical models or algorithms of any variety, possibly a heterogeneity of types of models, connected to each other by their dependency relations. That is, if the output of a model is required as an input to another, these models are connected in the graph. The models and their dependency relations form a directed graph. One or more models use as input the data acquired during the data acquisition step, and therefore form a start of the graph.

The model graph construction steps take advantage of these dependency relationships (input requirements) among the models to construct a directed graph. In some embodiments, the disclosure distinguishes two categories of models. Vector models are those models whose input takes a value along every frame of data. This includes trivially calculable models like individual velocity, and more complex models such as the dynamic classification of individuals into roles and groups (e.g. leader, follower, formations). On the other hand, many models have a higher dimensionality than vector models because they take a value not only at each frame of the match but also for each location on the area (calculated with a predetermined resolution that makes a trade off between accuracy and spee of the calculations). These models that rely on this grid of the area are spatial models. An example spatial model is time-to-contact, the amount of time it would take a specific individual to reach a specific location within the area. Evaluating this across all individuals for all points in the area creates a three-dimension output at each timestep, indexed by individual plus the two dimensions of the real-world coordinate system.

The two categories of models are distinguished due to their different computational requirements, and they are therefore treated differently in some embodiments by the model graph execution module. In some embodiments, all vector models are included in one vector model graph, whereas the spatial models are assembled into spatial model graphs only when they are needed, as determined by the event sensing substeps 104 described below.

In some embodiments, the event sensing step 104 comprises the substeps illustrated in FIG. 3. In this figure, steps are displayed indented when they are looped or repeated for each item in a set. First, a set of models 303 is used to construct a vector model graph 304. In some embodiments, only the minimum set of models is included, which is determined by collecting all the vector models required by all the patterns in the pattern library to be detected. In any case, the graph is constructed by iteratively joining each model to its corresponding dependency models with a directed edge. In this step, spatial models are skipped, as are vector models with spatial models as dependencies. This vector model graph is a subgraph of the hypothetical graph of all available vector and spatial models. Following the construction of the subgraph 304, it is evaluated 305. This is accomplished by traversing the model graph using a tree traversal algorithm that respects the dependency relationships; that is, one that guarantees no model is evaluated until its dependent inputs are already calculated. This could include breadth-first traversal or reversed postorder depth-first traversal. These algorithms are well-known and described for example in Morris (1979; "Traversing binary trees simply and cheaply"; Information Processing Letters). As each model is reached in the traversal of the graph, the model is evaluated. Model evaluation can entail a different procedure depending on the type of model. In some embodiments, models are evaluated by neural network inference, statistical inference, optimization, simulation, or random search (i.e., the Monte Carlo methods). The output of the models is stored for use in subsequent steps. In some embodiments, some models are evaluated in parallel in cases when the dependency relationships allow.

Following vector model graph evaluation 305, frames of the geospatial data 103 are looped over. In preferred embodiments, every frame is included in the loop, or sample; in other embodiments, some frames may be skipped for efficiency or other reasons. The impact of reducing the number of frames sampled depends on the framerate of the original data. For best results enough frames should be included to reach a sample framerate of at least two frames per second, although the true minimum depends on the models used in the respective embodiments and whether they are sensitive to small-scale fluctuations in the data.

In any case, at each frame in the sample a spatial model graph is constructed 306. The models to be included in the frame's spatial model graph are collected by passing the output of vector models and the geospatial data into the criteria of each entry to determine which models are required. In some embodiments, these models are assembled with identical models removed (which can happen for example in the case that two pattern library entries request the same model) and previously calculated models removed (thus, avoiding re-calculating vector models) and then iteratively constructed, in the same manner as with the vector model graph, into a frame-specific spatial model graph 306. Then, the graph is evaluated 307 in the same manner as the vector model graph, and the outputs accordingly stored.

In some embodiments, the event detection steps 302 follow the description steps 301 and occur within the loop over timesteps. That is, at every timestep sampled, the following steps are performed. For every entry in the pattern library, the criteria defined by the entry are evaluated 308 by the specified pattern matching operation. The most common pattern matching operation in some embodiments is a generic pattern matching operation. The generic pattern matching operation is capable of evaluating criteria referenced in the pattern library entry, referring to model outputs, and composing the criteria in a logical statement. The logical statements may contain equalities (representing specific values that must hold for the pattern to be matched), inequalities (representing ranges of values that must hold for the pattern to be matched), and logical operators AND, NOT, OR, and XOR (exclusive or), allowing other statements to be combined. The generic pattern matching operation also allows for criteria that reference model outputs that take a value for each individual. Pattern matching criteria specified by a pattern library entry can take the form of FOR ANY INDIVIDUAL MATCHING <SOME CRITERIA> or IF X OR MORE INDIVIDUALS MATCH <SOME CRITERIA>.

When the pattern matching step 308 finds a match, an event record is constructed 309. Event records 310 each identify one occurrence of an event with various attributes. In some embodiments, these comprise an event identifier or pattern identifier, which identifies the event or pattern type that occurred, the start and end times of the event as determined by the pattern matching operation, individuals that were involved in the event and their roles, and areas and real or hypothetical movements or actions that were part of the criteria evaluated by the pattern matching operation. These last elements, individuals, roles, areas, movements, and actions, are the constituent elements of the criteria used by the pattern matcher.

In some embodiments, event videos are included in some or all event records 310. These are created from one or more videos acquired during data acquisition and trimmed with respect to the start and end time specified in the event record 310.

Figure 4:
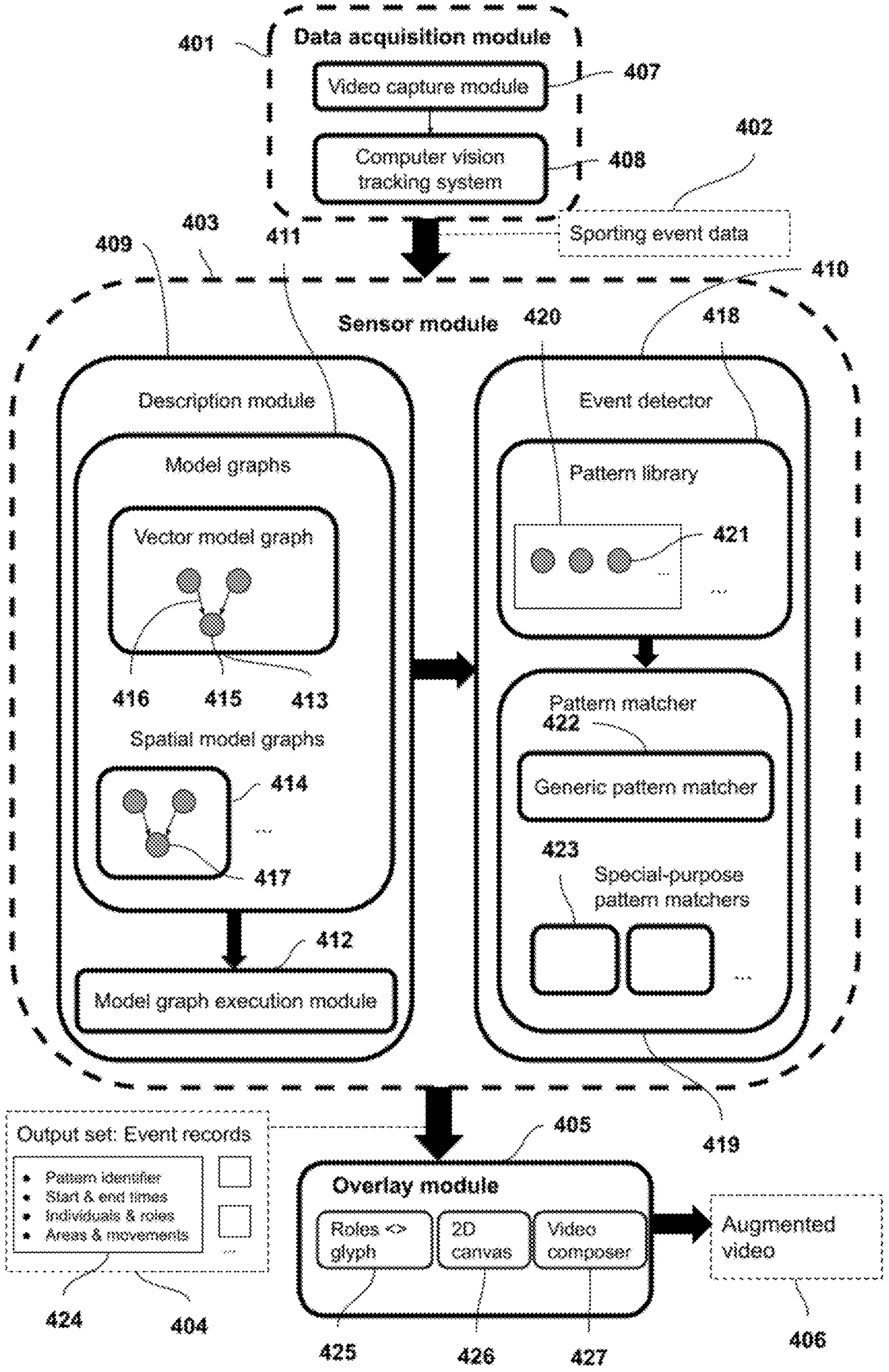
FIG. 4. Overall view of the computing system, the three general components (data acquisition module, sensor module, and overlay module), and the constituent modules of those components according to some embodiments of the disclosure.

As aforesaid, some embodiments relate to computing systems whose components, in some embodiments, are to execute the steps of the method described above. In this sense, the computing systems may include at least one processor, at least one memory, and a computer program stored in the at least one memory with instructions that, whenever run by the at least one processor, cause the computing system to execute the steps of the method described above. It will be noted that one or more processors of at least one processor, and one or more memories of the at least one memory may implement one, some or all modules as described, for example, with reference to FIG. 4. In this sense, multiple processors and/or multiple memories may implement the different modules without being part of a same computing device; in those cases, the computing system comprises two or more computing devices communicatively coupled via a wired or wireless connection.

Minimally, the system comprises a data acquisition module 401, configured to acquire geospatial data 402, and a sensor module 403, sometimes referred to as a performance sensor module, configured to detect events and generate an output set of event records 404. The system of this minimal embodiment senses events but without additional components, cannot augment video with overlay. Computing systems according to some preferred embodiments also include an overlay module 405 and are therefore able to generate augmented video 406.

The data acquisition module 401 is configured to acquire geospatial data 402 to be used by the subsequent modules. Minimally, the data acquired must include positional data. In some embodiments video, homographies, and/or metadata is also acquired. In some embodiments, data acquisition is via electronic transmission from an external source such as a database.

In some embodiments, the data acquisition module 401 includes a video capture module 407 responsible for collecting video to use as input for a computer vision tracking system 408. In some embodiments, the computer vision tracking system comprises a series of computer-implemented algorithms and models configured to execute the computer vision steps previously described 208. Alternatively, in some embodiments, the data acquisition module collects 401 data from one or more third-party data providers and provides it to the sensor module 403.

The requirements of the video capture module 407, in terms of collecting video sufficient for the computer vision tracking module, depends on a number of factors including area of the activity, potential camera locations, lighting conditions, and other environmental factors. A configuration used by systems of some embodiments comprises three or more cameras, mounted together near the center of the activity, at least 5 m (20 m preferred) above the individuals, pointed toward the activity such that the three or more cameras cover the entire area. In large areas, multiple such configurations may be required. Other configurations may produce video sufficient for use with the subsequent modules of the disclosure. Systems according to some embodiments include a computing device for relaying the video feeds across wired or wireless connection for further processing.

The sensor module 403 is responsible for identifying the patterns or events occurring in the geospatial data 402. In some embodiments, this is accomplished with a description module 409 and an event detector 410, also referred to as an event detector module or an event detection module. The description module 409 is responsible for developing a high-level description of the state of the activity. The event detector module 410 is responsible for determining, based on this description, the events that are occurring.

In some embodiments, the description module 409 comprises a representation of one or more model graphs 411, sometimes referred to as a variable graph module, and a model graph execution module 412, sometimes referred to as a variable graph execution module, configured to evaluate the model graphs as previously described.

In some embodiments, model graphs 411 comprises one or more (in preferred embodiments, only one) vector model graphs 413 and one or more (in preferred embodiments, one per frame sampled) spatial model graphs 414. Graphs are stored within the description module 409 or any connected storage medium, as directed graphs with every node representing a model 415 and every edge a dependency relation 416. Model X is the to depend on Model Y in the case that Model X requires as an input a value that is an output of Model Y. In the case of spatial model graphs 414, nodes 417 may be either spatial models or vector models (vector models can be included here in some embodiments; for example if a vector model has spatial model dependencies, it can only be evaluated in a spatial model graph).

In some embodiments, the graph execution module 412 is configured to traverse the graph as previously described and trigger a variety of computer-implemented model evaluation procedures, for each model retrieving from storage its required data from the data available and previous outputs of others models, executing the specified procedure, which may be stored locally or queried from a remote source, and store the model's output for future use.

In some embodiments, the event detection module 410 comprises a pattern library 418 and a pattern matcher module 419 configured to evaluate the criteria defined in the pattern library according to the description provided by the description module 409, using the method previously described, or a variant thereof. A pattern library is sometimes referred to as an event library or event type library.

In some embodiments, within the pattern library 418, each entry 420 represents one type of event or pattern to be detected and is stored along with basic metadata for display to the user, including name and categorization attributes. Additionally, each entry is associated with one or more models 421, indicating which values (model outputs) the criteria for the event will be compared against. Patterns in the pattern library may also determine the required models conditionally; this saves computational cost when this information is given to the model graph execution module 412. Typically, models are not needed during frames when the event is not applicable. For example, in many contexts there are moments when certain events cannot logically occur, such as during stoppage of play in a sporting event, and therefore few models need to be evaluated. In some embodiments, patterns in the pattern library may also reference parameters, and in some embodiments also rules for inferring roles of dynamic activity participants and for identifying relevant locations and areas within the space of the activity.

The pattern matching module 419 is configured to evaluate criteria in the pattern library 418 and contains one or more pattern matchers, a component implementing a specific method for matching pattern library entries. Specifically, pattern matchers match the descriptions from the description module with the events from the pattern library. Systems according to some embodiments contain one generic pattern matcher 422 and one or more special-purpose pattern matchers 423. The generic pattern matcher 422 is capable of evaluating criteria referenced in the pattern library according to the previously described generic pattern matching operation. Special-purpose pattern matchers 423 are configured to take into account other factors using different logic which can include patterns of model output values over time and other examples given below.

In some embodiments, special-purpose pattern matchers match patterns in the pattern library using other methods. These may be specific to a pattern or useful for multiple patterns. For example, the temporal sequence pattern matcher is a special- purpose pattern matcher used in some embodiments. Whereas the generic pattern matcher checks the criteria at particular moments, the temporal sequence pattern matcher checks different criteria at different moments. That is, it is capable of matching patterns in the pattern library defined with the form "First criteria set A must occur, then criteria set B must occur, then criteria set C must occur". The criteria sets themselves are the same as those used by the generic pattern matcher, but the temporal sequence pattern matcher allows for multiple criteria sets to be checked in a sequence. The criteria sets are joined with a logical and operation such that if even one does not occur, the pattern is not matched. Each pattern in the pattern library that uses the temporal sequence pattern matcher can select different sequence time minimums and maximums defining the duration of the time window during which the sequence must occur.

The sensor module 403 generates an output set 404 which comprises event records 424, as described previously. The output set may be digitally stored for future retrieval and/or directly transmitted to the overlay module 405.

Systems according to some embodiments comprise an overlay module 405, configured to augment a video feed within the geospatial data 402 with a partially transparent graphical overlay based on event records 424, generating augmented video 406. The overlay module is sometimes referred to as automatic telestration module. By a lookup table 425, the roles assigned to individuals and/or relevant areas in the event record map to specific visual elements, or glyphs. This lookup table is sometimes referred to as a telestration library. Circles, lines, arrows, and heatmaps are all types of glyphs used in some embodiments. For example, an event containing the action "pass" draws an arrow glyph between the individual labeled with the role "passer" and the individual labeled with the role "pass-target". In some embodiments there is support for higher-level glyph types such as "trajectory" which draws multiple line glyphs that together draw the trail of the individual's movement over the course of the event. In some embodiments, for every video frame glyphs are drawn initially on a transparent 2D canvas 426 in field coordinates. This canvas is then transformed from field coordinates to video coordinates as defined by a homography from the geospatial data 401. The 2D canvas including the homography transformation is also referred to as a telestration potter. In some embodiments, the overlay module 405 further comprises a video composer 427, configured to combine images from transformed 2D canvases with the associated frame of the original video and then join such frames together to generate an augmented video 406. In some embodiments there is support for a variety of glyphs comprising individual highlights, lines, arrows, and polygons (filled and unfilled).

Figure 5:
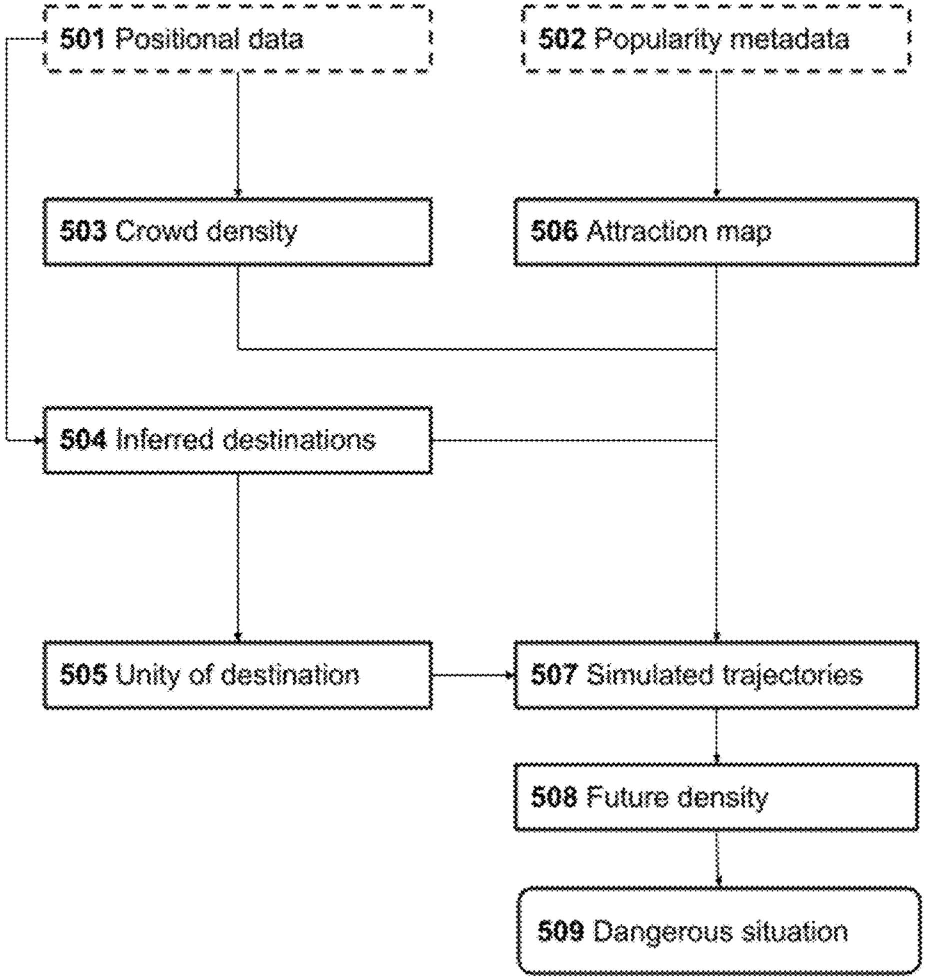
FIG. 5. An illustration of the model graph in some embodiments of the disclosure that detect dangerous crowd situations. Elements of the geospatial data are shown with a dashed outline; the pattern definition is shown with rounded edges; boxes with solid outlines represent models in the model graph.

In the following section, several applications or domains to which the disclosure can be applied are described, with reference to FIGS. 5-7.

In some embodiments, the method detects dangerous situations to aid in crowd control in activities during which large numbers of people are moving about, such as music festivals. In the case that people are trying to reach the same goal at the same time and begin crowding together, a dangerous human crush situation can result in serious injury or death. In these embodiments, individuals are event attendees, and events are dangerous situations, where the danger is specifically crush risk.

In some embodiments of the disclosure, a crush can be detected based on variables such as density of people. If the density is greater than a certain number of people per square meter, a crush situation. These embodiments include a model graph that outputs crowd density using known methods, for example the method described by Li (2020, "A Crowd Density Detection Algorithm for Tourist Attractions Based on Monitoring Video Dynamic Information Analysis", DOI:10.1155/2020/6635446); and a pattern definition defining crush events as those with a density greater than 2 people per square meter, a well-known safety threshold (see Guide to Safety at Sports Grounds, 6th edition, published by UK Sports Ground Safety Authority, 2018).

Some embodiments, in order to predict a crush early enough for the event organizers to provide an outlet or otherwise intervene, include additional models in the model graph. FIG. 5 illustrates the model graph of some such embodiments. In some embodiments, the model graph includes the previously mentioned crowd density model 503, which uses positional data 501 as its input. In some embodiments, the model graph includes a model outputting the inferred destination of each pedestrian 504, implemented using known machine learning methods such as the one described by Banjerjee, Ranu, and Raghavan (2016, "Inferring Uncertain Trajectories from Partial Observations", arxiv:1603.0764v1) and using positional data as its input. Some embodiments further comprise a model taking inferred destinations as its input that itself outputs unity of destination 505, taking a high value when participants are likely to have the same, or nearby, destinations, and lower values when participants' destinations are more spread around the event grounds. This model implements a method known as Kuramoto synchronization and described, for example, by Acebrón, Bonilla, Vicente, Retort, and Spigler (2005, "The Kuramoto model: A simple paradigm for synchronization phenomena", DOI:10.1103/RevModPhys.77.137). Some embodiments include a model that outputs attraction map 506, which outputs for every (x, y, time) location in time the attractiveness to the crowd, based on popularity metadata 502 in the geospatial dataset originally provided by activity organizers. This model is implemented as a simple heuristic that assigns attractiveness values based on proximity to performances according to the popularity of each performance, with higher attractiveness assigned to locations near popular performances, especially as they are scheduled to begin. Some embodiments further comprise a model that outputs simulated trajectories 507, based on the the previously described model outputs, and implemented using collective adaptive systems methods as described by Viroli, Bucchiarone, Pianini, and Beal (2016, "Combining Self-Organisation and Autonomic Computing in CASs with Aggregate-MAPE", DOI:10.1109/FAS-W.2016.49). Some embodiments further comprise a model that outputs future density 508 based on simulated trajectories 507, implemented using windowed aggregation over the simulated trajectories. The model graph therefore implies a heterogeneity of methodologies, including machine learning, direct domain knowledge, external data sources, and simulation.

In these embodiments, the pattern library includes a pattern definition that defines dangerous situations 509 as occurring whenever the future density 508 variable exceeds a predetermined threshold. Again, the typical threshold of 2 people per square meter is preferred. Such embodiments of the disclosure therefore have the useful function of predicting future crush events.

In some embodiments, the method identifies spread events of a particular pathogen (such as SARS-CoV-2, the pathogen that causes COVID-19) in a public place. Sensing these events has useful functions for public health and epidemiology, including but not limited to estimating spread rates, measuring the effect of policies, and predicting outbreaks. In these embodiments, individuals are pedestrians in public places, and events are moments when two or more people come into contact with each other in such a way that can spread a contagious disease between them.

Figure 6:
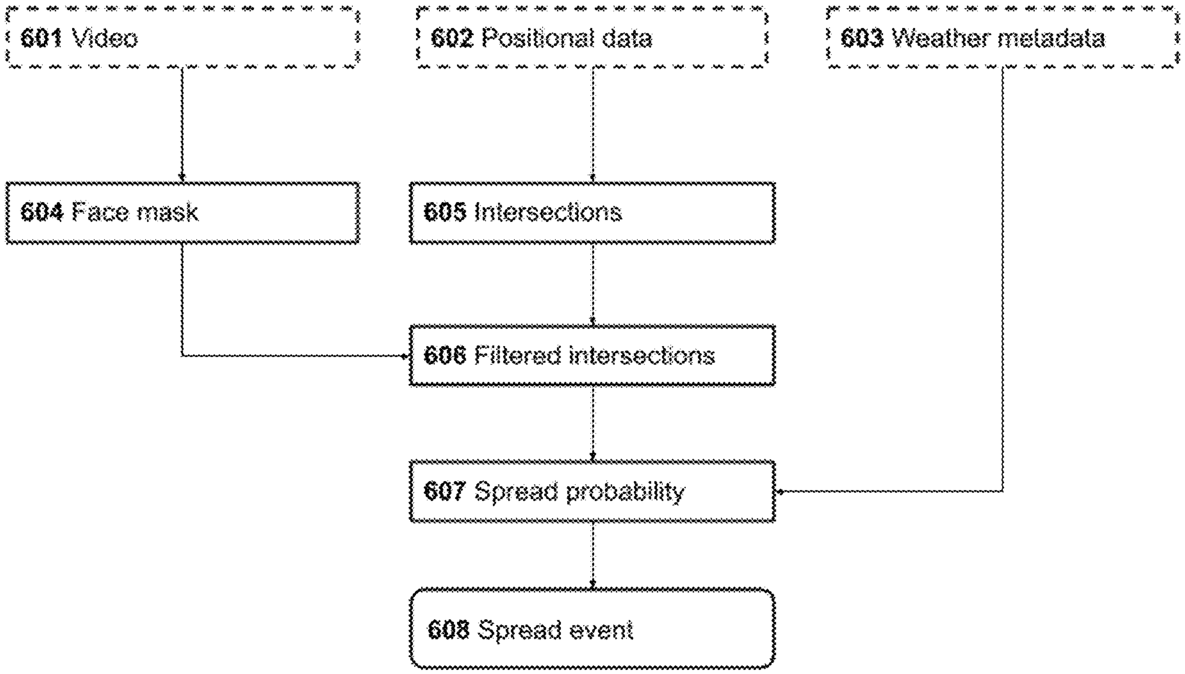
FIG. 6. An illustration of the model graph in some embodiments of the disclosure that detect virus spread events. Elements are represented as in FIG. 5.

FIG. 6. Illustrates the model graph of some embodiments that detect spread events. In some embodiments of the disclosure, the model graph includes a model that implements a known computer vision method for face covering detection as described by Jiang, Gao, Zhu, and Zhao (2021, "Real-Time Face Mask Detection Method Based on YOLOv3", DOI:10.3390/electronics1007083), that outputs whether each individual in the video of the activity 601 is wearing a face mask 604. Some embodiments further include in the model graph an implementation of intersection searching as described by Gupta, Janarda, and Smid (1995, "Further Results on Generalized Intersection Searching Problems: Counting, Reporting, and Dynamization", DOI:10.1006/jagm.1995.1038), that uses positional data 602 as an input. The outputs of this model, also known as range searching, are intersections 605, instances in time and space when the trajectories of two individuals pass within a certain distance. Some embodiments further include a model in the graph that filters the intersection outputs 605 and outputs filtered intersections 606. Intersections pass the filter according to whether the participants are detected to be wearing a mask, with intersections with all individuals wearing a face mask ignored. Some embodiments include in the geospatial dataset weather metadata 603 including at least factors such as wind speed and temperature, acquired during data acquisition from externally available sources by means of a wired or wireless connection (e.g., by API calls over an internet connection. Some embodiments further include a model that outputs spread probability 607, implemented based on filtered intersections 606 and weather metadata 603 according to known information about the pathogen in question. For example, in some embodiments configured to detect COVID-19 spread events, spread probability is based on the findings of Zhao, Qi, Luzzatto-Fegiz, Cui, and Zhu (2020, "COVID-19: Effects of Environmental Conditions on the Propagation of Respiratory Droplets", DOI:10.1021/acs.nanolett.0c03331). Some embodiments include an entry in the pattern library that defines spread events 608 as those intersections whose spread probability exceeds a pre-determined threshold. When used for statistical purposes, a threshold of 50% is preferred, although other thresholds can produce valuable outputs as well, such as to produce ranges of confidence.

Some embodiments of the disclosure detect tactical events during a sports activity. Identifying these events has useful purposes including but not limited to training, player evaluation, and sports journalism. In these embodiments, individuals are players and the dynamic activity is a sporting event.

Figure 7:
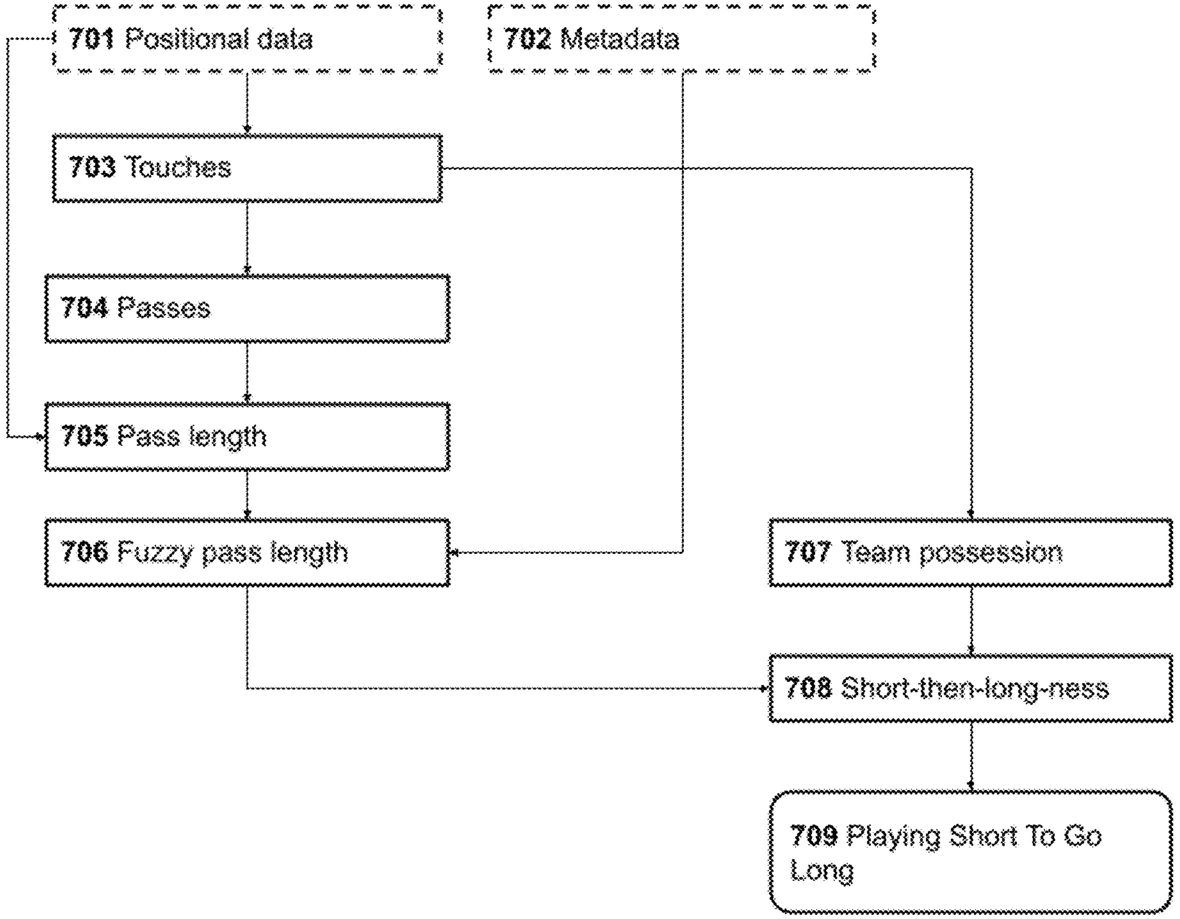
FIG. 7. An illustration of the model graph in some embodiments of the disclosure that detect the tactical event Playing Short to Go Long in association football. Elements are represented as in FIG. 6.

FIG. 7 illustrates the model graph of some embodiments that detect Playing Short To Go Long, an event of tactical nature in association football (soccer). In some embodiments there is a model that estimates the ball touches 703. These models are known in the prior art, for example the method described by Vidal-Codina (2021, "Automatic event detection in football using tracking data", MIT Sports Summit 2021) which requires tracking data of players plus the ball 701. In some embodiments there is a model that estimates passes 704. This model uses a heuristic that detects a pass when two consecutive touches 703 occur between different players on the same team. Some embodiments further compute pass length 705 computed using the Euclidean distance between the two locations in the positional data 701 at which passes 704 were detected.

In some embodiments there is a model named "fuzzy pass length" 706, which categorizes passes into categories. This model has two components, "shortness" and "longness" which take values from zero to one. These are calculated first by scaling observed pass length 705 to the size of the pitch (pitch size being one of the values in the metadata 702, in such embodiments) such that the effective pass length is longer on smaller pitches. Then, shortness and longness are calculated as piecewise linear functions taking two parameters each. When pass length is less than the lesser shortness parameter, shortness is equal to 1. When pass length is greater than the greater shortness parameter, shortness is equal to 0. For longness, the parameters have the opposite effect. The parameters need not be symmetric and therefore the resulting values are not necessarily complementary. That is, a medium-length pass could have values of shortness=0.5 and longness=0.5 (complementary), or it could very well have shortness=0.1 and longness=0.4 (not complementary), depending on the parameter values. However, in preferred embodiments, a symmetric parameter set with equal zero-points for shortness and longness, in order to simplify parameter fitting, is used. Preferred values are such that shortness=1 at scaled pass length=10, shortness=0 at scaled pass length=15 m, longness=0 at scaled pass length=15 m, and longness=1 at scaled pass length=30 m. Whether any particular parameter combination produces reasonable results is a matter of all four parameters; therefore reasonable ranges cannot be given. In general these values can be scaled up to 25% in either direction on their own or up to 50% if the adjustments are made with coordination of all four parameters.

In some embodiments there is a model that outputs team possession 707. A minimal model of team possession is a heuristic that outputs the team of the last touch 703. In other embodiments, a possession is only awarded after two consecutive touches by the same team; if a team touches only once before the other team touches the ball, then this period of time is output as undetermined possession. Another model in some embodiments, short-then-longness 708, is the multiplication of the fuzzy values 706, in particular the shortness values of one or more passes with the longness value of the next pass. Constraints are applied to which sequences of passes are considered: they must be from the same team, without losing team possession 707 in-between.

Playing Short To Go Long 709 is a tactical event detected in some embodiments describing the execution of a long pass that follows one or more short passes. It is executed in order to draw in defenders, creating space in a more distant area of the pitch, which can then be attacked with a long pass. Any sequence of passes with short-then-longness 708 above a predefined threshold is detected as an occurrence of this event. In the case that overlapping sequences are detected, the one with the most short passes is kept and the others are discarded. For example, given the sequence Short_1, Short_2, Short_3, Long_4, the criteria would first detect three sequences: one with two passes, one with three, and another with all four. Then, the method would discard all but the longest one (and in the method all would be discarded but the longest one). In addition to the parameters already described for the models involved, this event adds one additional parameter: an overall detection threshold. This determines the minimum criterion of the value of short-then-longness. In preferred embodiments a value of 50% is used, although values from 30% to 85% produce reasonable results. This criterion can be adjusted by the user of the method to detect more or fewer occurrences of this event. For example, in some use cases of the method and/or system, it may be beneficial to highlight only the most extreme occurrences.

What is claimed is:

1. A computer-implemented method comprising:

processing data describing a sporting event in order to:

evaluate a collection of models, each receiving as input at least part of the processed data, or part of an output of other models in the collection of models, or a combination thereof;

compare outputs of the models to at least one entry in an event library, each entry including data at least indicative of a type of gameplay event in terms of criteria defined over output values of at least part of the collection of models; and output an event record whenever the criteria of an entry in the event library are satisfied by the outputs of the models, the event record including data at least indicative of the type of gameplay event represented by the corresponding entry in the event library, wherein the criteria of one or more entries in the event library are represented in terms of a temporal sequence of sub-criteria;

evaluating said sub-criteria and generating an event record for said entry in the event library in case that all the sub-criteria of each element in the sequence are matched in the appropriate sequence, wherein one or more entries in the event library that defines a sequence of sub-criteria additionally defines constraints on a time window during which its temporal sequence can occur, in terms of minimum durations or maximum durations or a combination thereof; and evaluating the duration of any matched temporal sequence of sub-criteria, and outputting an event record in case said time-window constraints are met.

2. The computer-implemented method of claim 1, wherein each entry in the event library additionally includes data at least indicative of one or more sets of criteria for assigning roles to players involved in the gameplay event;

the method additionally comprising evaluating the one or more sets of criteria for each event record; and in case the criteria are satisfied by one or more players, the event record additionally includes data at least indicative of the player or players performing the corresponding role.

3. The computer-implemented method of claim 2, wherein each entry in the event library additionally includes data at least indicative of a mapping of player roles to visual elements, and the method additionally comprising generating a video at least including the visual elements corresponding to at least one event record.

4. A computing system, comprising:

at least one processor, and at least one memory, both for implementation of a data acquisition module and a sensor module; the at least one memory comprising: a collection of models, an event library with each entry including data at least indicative of a type of gameplay event in terms of criteria defined over output values of at least part of the collection of models, and instructions which, when executed by the at least one processor, cause the computing system to at least perform the following:

the data acquisition module is configured to acquire data, by digital transfer or sensors, describing a sporting event;

the sensor module is configured to:

evaluate a collection of models, each receiving as input at least part of the acquired data, or part of an output of other models in the collection, or a combination of both;

compare outputs of the models to at least one entry in an event library, each entry including data at least indicative of a type of gameplay event in terms of criteria defined over output values of at least part of the collection of models;

output an event record whenever the criteria of an entry in the event library are satisfied by the outputs of the models, the event record including data at least indicative of the type of gameplay event represented by the corresponding entry in the event library, wherein the criteria of one or more entries in the event library are represented in terms of a temporal sequence of sub-criteria;

evaluate said sub-criteria and generate an event record for said entry in the event library in case that all the sub-criteria of each element in the sequence are matched in the appropriate sequence, wherein one or more entries in the event library that defines a sequence of sub-criteria additionally defines constraints on a time window during which its temporal sequence can occur, in terms of at least one of minimum durations or maximum durations; and evaluate the duration of any matched temporal sequence of sub-criteria, and output an event record in case said time-window constraints are met.

5. The computing system of claim 4, wherein each entry in the event library additionally includes data at least indicative of one or more sets of criteria for assigning roles to players involved in the gameplay event;

the sensor module is further configured to:

evaluate the one or more sets of criteria for each event record, and in case the criteria are satisfied by one or more players, include in the event record data at least indicative of the player or players performing the corresponding role.

6. The computing system of claim 5, wherein each entry in the event library additionally includes data at least indicative of a mapping of player roles to visual elements, and the sensor module is further configured to generate a video at least including the visual elements corresponding to at least one event record.

7. A non-transitory computer-readable medium having instructions that, when executed by at least one processor of at least one computing device, cause the at least one processor to process data describing a sporting event in order to:

evaluate a collection of models, each receiving as input at least part of the processed data, or part of an output of other models in the collection of models, or a combination thereof;

compare outputs of the models to at least one entry in an event library, each entry including data at least indicative of a type of gameplay event in terms of criteria defined over output values of at least part of the collection of models;

output an event record whenever the criteria of an entry in the event library are satisfied by the outputs of the models, the event record including data at least indicative of the type of gameplay event represented by the corresponding entry in the event library, wherein the criteria of one or more entries in the event library are represented in terms of a temporal sequence of sub-criteria;

evaluate said sub-criteria and generate an event record for said entry in the event library in case that all the sub-criteria of each element in the sequence are matched in the appropriate sequence, wherein one or more entries in the event library that defines a sequence of sub-criteria additionally defines constraints on a time window during which its temporal sequence can occur, in terms of minimum durations or maximum durations or a combination thereof; and evaluate the duration of any matched temporal sequence of sub-criteria, and output an event record in case said time-window constraints are met.

8. The non-transitory computer-readable medium of claim 7, wherein each entry in the event library additionally includes data at least indicative of one or more sets of criteria for assigning roles to players involved in the gameplay event;

the instructions further cause the at least one processor to:

evaluate said one or more sets of criteria for each event record, and in case said criteria are satisfied by one or more players, include in the event record data at least indicative of said player or players performing the corresponding role.

9. The non-transitory computer-readable medium of claim 8, wherein each entry in the event library additionally includes data at least indicative of a mapping of player roles to visual elements, and the instructions further cause the at least one processor to generate a video at least including the visual elements corresponding to at least one event record.

10. A computing system, comprising:

at least one processor, and at least one memory, both for implementation of a data acquisition module and a sensor module;

the at least one memory comprising:

a collection of models, an event library with each entry including data at least indicative of a type of gameplay event in terms of criteria defined over output values of at least part of the collection of models, and instructions which, when executed by the at least one processor, cause the computing system to at least perform the following:

the data acquisition module is configured to acquire data, by digital transfer or sensors, describing a sporting event;

the sensor module is configured to:

evaluate a collection of models, each receiving as input at least part of the acquired data, or part of an output of other models in the collection, or a combination of both;

compare outputs of the models to at least one entry in an event library, each entry including data at least indicative of a type of gameplay event in terms of criteria defined over output values of at least part of the collection of models;

output an event record whenever the criteria of an entry in the event library are satisfied by the outputs of the models, the event record including data at least indicative of the type of gameplay event represented by the corresponding entry in the event library, wherein each entry in the event library additionally includes data at least indicative of one or more sets of criteria for assigning roles to players involved in the gameplay event;

evaluate said one or more sets of criteria for each event record; and in case said criteria are satisfied by one or more players, include in the event record data at least indicative of said player or players performing the corresponding role.

11. The computing system of claim 10, wherein the criteria of one or more entries in the event library are represented in terms of a temporal sequence of sub-criteria; and the sensor module is further configured to evaluate said sub-criteria and generate an event record for said entry in the event library in case that all the sub-criteria of each element in the sequence are matched in the appropriate sequence.

12. The computing system of claim 11, wherein one or more entries in the event library that defines a sequence of sub-criteria additionally defines constraints on a time window during which its temporal sequence can occur, in terms of at least one of minimum durations or maximum durations, and the sensor module is further configured to evaluate the duration of any matched temporal sequence of sub-criteria, and output an event record in case said time-window constraints are met.

13. The computing system of claim 10, wherein each entry in the event library additionally includes data at least indicative of a mapping of player roles to visual elements, and the sensor module is further configured to generate a video at least including the visual elements corresponding to at least one event record.

* * * * *